US 6,582,484 B2

(12) United States Patent
Wilson

(10) Patent No.: US 6,582,484 B2
(45) Date of Patent: Jun. 24, 2003

(54) CANDLE COMPOSITION

(75) Inventor: Sonia Katharine Wilson, Reading (GB)

(73) Assignee: Reckitt Benckiser (UK) Limited, Slough (GB)

( * ) Notice: Subject to any disclaimer, the term of this patent is extended or adjusted under 35 U.S.C. 154(b) by 0 days.

(21) Appl. No.: 09/950,404

(22) Filed: Sep. 11, 2001

(65) Prior Publication Data

US 2002/0069580 A1 Jun. 13, 2002

Related U.S. Application Data

(63) Continuation of application No. PCT/GB00/00879, filed on Mar. 10, 2000.

(30) Foreign Application Priority Data

Mar. 11, 1999 (GB) ................................ 9905558

(51) Int. Cl.⁷ ............................ C10L 7/00; C11C 5/00
(52) U.S. Cl. ........................ 44/275; 44/268; 431/288; 431/289; 431/291
(58) Field of Search ...................... 44/275, 265, 268; 431/288, 289, 291

(56) References Cited

U.S. PATENT DOCUMENTS

| 5,132,355 | A | | 7/1992 | Nahlovsky |
| 5,221,534 | A | | 6/1993 | DesLauriers et al. |
| 5,578,089 | A | | 11/1996 | Elsamaloty |
| 5,879,694 | A | * | 3/1999 | Morrison ............... 44/269 |
| 5,884,639 | A | * | 3/1999 | Chen ................... 524/474 |
| 6,066,329 | A | * | 5/2000 | Morrison ............... 44/269 |
| 6,096,102 | A | * | 8/2000 | Matthai et al. ......... 44/275 |
| 6,129,771 | A | * | 10/2000 | Ficke et al. ............ 44/275 |

FOREIGN PATENT DOCUMENTS

| EP | 0 224 389 A2 | | 6/1987 |
| EP | 0 224 389 A2 | | 6/1997 |
| WO | WO 96/34077 A1 | | 10/1996 |
| WO | WO 97/08282 A1 | | 3/1997 |
| WO | WO 97/31623 A1 | | 9/1997 |
| WO | WO-00/53707 | * | 9/2000 |

* cited by examiner

*Primary Examiner*—Margaret Medley
(74) *Attorney, Agent, or Firm*—Akin Gump Strauss Hauer & Feld, L.L.P.

(57) ABSTRACT

Gelled hydrocarbon compositions are provided which include a low molecular weight triblock polymer and a medium molecular weight triblock polymer. These gels can be used to make clear candles.

14 Claims, No Drawings

CANDLE COMPOSITION

CROSS-REFERENCE TO RELATED APPLICATION

This application is a continuation of International Application No. PCT/GB00/00879, filed Mar. 10, 2000, the disclosure of which is incorporated herein by reference, which was published in the English on Sep. 14, 2000, under International Publication No. WO 00/53707.

BACKGROUND OF THE INVENTION

The invention relates to a clear candle containing a gelled or solidified hydrocarbon oil.

Candles of gelled hydrocarbon oils are well known, for example, as described in International Patent Publication Nos. WO 96/34077 and WO 97/08282. However, these gelled, clear candles have the potential to catch fire, since the difference between the pool temperature and flashpoint is smaller than in conventional wax candles. If the candle then ignites, flames as high as 30 cm can occur with black smoke emanating. This is a potential health hazard and, indeed, is a reason why there have been a number of product recalls.

In addition it is important that the gelled candles do not flow when the candle holder is tipped on its side (e.g., as may occur during transportation or accidental spillage). Once the wick is buried in the gelled candle material, the product is spoiled. In other words, such a candle material must be firm (i.e., not flow) and have a large difference between the pool temperature and the flash point.

In the past it has been found that if, for example, the difference between the pool temperature and flash point is an acceptable amount, then there is too much flow, or vice versa. It has proved to be very difficult, if not impossible, to obtain an acceptable difference between pool temperature and flash point and, at the same time, produce a candle having desirable flow.

It is also well known in the art to use such gelled hydrocarbon oils for uses other than candles. For example, European Patent No.0 224 389 discloses styrene-dyene block copolymer compositions. However, none of these compositions would have suitable characteristics for forming candles.

International Patent Application No. WO97/31623 discloses gelled compositions suitable for a wide range of uses, but not suitable for use in candles. This is particularly because the hydrocarbon used in the compositions disclosed in this international application are volatile and thus would be likely to present a severe fire hazard if used in candles. In addition, the material forming the candle would simply disappear with time, due to evaporation of the hydrocarbon.

BRIEF SUMMARY OF THE INVENTION

To alleviate these problems, there is provided a gelled hydrocarbon composition, suitable for use as a candle body, comprising a hydrocarbon oil gelled with a low molecular weight and a medium molecular weight triblock polymer.

It has been found that through careful selection of the low molecular weight and medium molecular weight triblock polymer, a candle having improved safety results. In other words, through this careful selection, a candle may be formed in which the flash point and the pool temperature have acceptable values, and the difference between the pool temperature and the flash point is also large enough. Further, the resultant candle does not flow when the candle holder is tipped on its side.

DETAILED DESCRIPTION OF THE INVENTION

By low molecular weight triblock polymer is preferably meant a triblock polymer of molecular weight (either Mw or Mn) from 20,000 to 82,000, more preferably 50,000 to 82,000. Most preferably, Mw is about 78,000 and Mn is about 73,000, expressed as "polystyrene equivalent" molecular weights. An example of such a low molecular weight polymer is KRATON® G1652.

By medium molecular weight triblock polymer is preferably meant a triblock polymer of molecular weight (either Mw or Mn) of from 82,000 to 150,000, more preferably 85,000 to 120,000. Most preferably, Mw is about 95,000 and Mn is about 89,600, expressed as "polystyrene equivalent" molecular weights. An example of such a medium molecular weight polymer is KRATON® G1650.

Preferably, the molecular weight is measured by a technique known as "Comparison of the molecular weight distributions of ethylene-butylene-styrene copolymers using Gel Permeation Chromatography", the process of which is as follows:

The determination of triblock polymers having low and medium molecular weight is expressed as the polystyrene equivalents. The samples are analyzed using gel permeation techniques with tetrahydrofuran as the solvent and columns appropriate to low/medium molecular weight polymers.

A single solution of the sample is prepared by adding 10 ml of solvent to 20 mg of the sample and leaving for a minimum of four hours to dissolve. A small amount of 1,2-dichlorobenzene in the solvent is added as an internal marker, and the solutions are mixed thoroughly. The solutions are filtered through a 0.2 micron polyamide membrane into sample vials, which are placed in an autosampler.

Chromatographic conditions are as follows:

Columns: Pl gel 2X mixed bed D 30 cm, 5 microns
Flow rate: 1.0 ml/min
Temperature: 30° C.

Data acquisition and handling are carried out using Viscotek "Trisec 3.0" software. The GPC system was calibrated with polystyrene, and the results are expressed as "polystyrene equivalent" molecular weight.

The term "triblock polymer" is one well known in the art, and suitable triblock polymers are styrene-ethylene/butylene-styrene block copolymers, such as are sold under the trade name KRATON® G by Shell. These copolymers are hydrogenated and are thus thermally stable. That is to say, decomposition is not likely to occur during the blending of the copolymer with the hydrocarbon oil. The KRATON® G copolymers are indicated as being compatible with paraffinic and napthenic oils and are reported as taking up more than 20 times their weight in oil to make a gelled product. Such co-polymers are described in WO 96/34077 and WO 97/08282, the contents of which are incorporated herein by reference.

The triblock is often substantially pure triblock and may also include up to 5% diblock copolymer. Alternatively, the triblock copolymers may contain blends with radial block copolymer or multiblock copolymer. Such copolymers and blends are described in WO 97/08282 and WO 97131623.

Desirable blends of low molecular weight and high molecular weight are in the ratios of 1:20 up to 20:1. Preferably, the blends are in the ratio of 1:10 up to 10:1, more preferably 1:5 up to 5:1.

Both the low and medium molecular weight polymers are tri-block co-polymers of the form a-b-a, where b is an oil soluble residue (e.g., ethylene or butylene) and a is an insoluble styrene residue. An example of this type of polymer is from the KRATON® G series of thermoplastic rubber polymers.

These polymers are a linear block styrene-ethylene-butylene-styrenes (SEBS) which have been hydrogenated to impart thermal stability during processing. These tri-block polymers are supplied as >99% pure systems with either low, medium or high molecular weights. These products can then be blended in the laboratory to change the rheological properties of the final hydrocarbon-oil gel as desired.

The hydrocarbon oil used is desirably a natural or synthetic hydrocarbon oil of $C_{16}$ to $C_{50}$, desirably as disclosed in WO 96/34077 or WO 97/08282. The oil may, for example, be a paraffinic oil, a naphthenic oil or a natural mineral oil. The hydrocarbon oil can, for example, be a natural or synthetic cosmetic grade hydrocarbon oil. The hydrocarbon oil desirably is in liquid form at temperatures from 0° C. to 200° C. Preferred hydrocarbon oils are selected from paraffinic oils naphthenic oils or natural mineral oils, more preferably a white oil.

Advantageously, the vapour pressure of the hydrocarbon oil is very low, typically negligible at 20° C. Preferably, hydrocarbon oil comprises a carbon chain of 18 to 30 carbons.

The resistance to flow of the gelled compositions can be improved further by the addition of 0.01–3 wt % of a fatty acid, e.g., a compound of formula I or formula II:

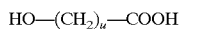
$$HO—(CH_2)_u—COOH \qquad (I)$$

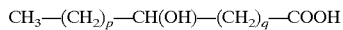
$$CH_3—(CH_2)_p—CH(OH)—(CH_2)_q—COOH \qquad (II)$$

in which u is 8 to 24; p is 0 to 16, preferably 1 to 8, more preferably 3 to 5; and q is 8 to 24, preferably 8 to 16, more preferably 8 to 10. Desirably p plus q is from 8 to 24, preferably 12 to 20, more preferably 14 to 18.

A preferred fatty acid is a stearic acid containing one or more hydroxy groups. A particularly preferred stearic acid is 12-hydroxystearic acid.

A gelled composition according to the invention will generally have an attractive clear appearance.

Further, according to the invention, there is provided a candle comprising
i) a candle body, and
ii) a wick located in the body,
the body comprising a gelled hydrocarbon composition comprising a hydrocarbon oil and from 0.01 to 3 wt % of a fatty acid, the composition being gelled by polymerization with a low molecular weight and a medium molecular weight triblock polymer.

Still further, according to the invention, there is provided a process for preparing a gelled hydrocarbon composition comprising:
i) mixing (e.g., homogenizing) the hydrocarbon oil with the powdered triblock copolymers at elevated temperature (e.g., 100–120° C.), and
ii) optionally reducing the temperature of the above mixture (e.g., to about 70–90° C.), and
iii) while mixing (e.g., at 400–500 rpm) adding the fatty acid and, optionally, fragrance and/or other additives to the above mixture.
The resulting mixture may then be homogenized at, for example, 400–500 rpm.

The candle body desirably comprises the hydrocarbon oil in an amount of 70 to 99 wt %, preferably 85 to 95 wt %, more preferably about 90 wt %. Preferably, the triblock polymers are present in an amount of 1–30 wt %, more preferably 5–15 wt %. Preferably, the fatty acid is present in an amount of 0.1 to 3 wt %, more preferably 0.2 to 2 wt %, most preferably 0.5 to 1 wt %.

The candle body may further comprise components, preferably 1 to 20% wt, such as one or more compounds selected from fragrances, malodor counteractants, insecticides, pesticides, insect repellants, colorants, anti-oxidants, preservatives, anti-ingestion agents, stabilizers, deodorizers, and masking agents.

Suitable fragrances are generally known in the art, for example one comprising fragrant materials selected from one or more of the following: cedarwood oil, sandalwood oil, bergamot, Bulgarian rose oil, patchouli, myrrh, clove leaf oil, linalol, ethyl alcohol, tepineol, menthol, citronella, and phenyl ethyl alcohol. The fragrance normally comprises a carrier solvent, such as diethylphthalate, carbitol, dipropyleneglycol, or dipropylglycol. Preferably, 1–10 % wt are present.

Suitable malodor counteractants are well known, for example one or more aroma and/or non-aroma chemicals which are known to have an action in reducing the perception of the intensity of malodors, for example unsaturated esters, ketones, aldehydes, and/or fragrant materials, such as citronella or cedarwood oil (which is known to counteract the perception of tobacco malodor). Preferably, 0.1–10 wt % are present.

Suitable insecticides, pesticides and insect repellants are well known for use in the invention, for example a pyrethroid, niotinoid, rotenoid, tetramethrin, bioallerthrin, allethrin, phenthrin, dinitrophenol, organothiocyamate, benzene hexachloride, citronellal, a polychlorinated cyclic hydrocarbon (for example Heptachlor®, Aldrin® or telodrin) or an organophosphorus compound, for example tetraethyl pyrophosphate). Preferably, 1–10 wt % is present.

Any colorant used should be oil soluble. Examples of suitable colorants are Iragon® Green, Iragon® Violet, Sandoplast Blue 2B, and Fat Red 5B02. Preferably, up to 2 wt % is present.

A suitable anti-oxidant is, for example, tocopherol, ascorbyl palmitate, butylated toluene, ascorbic acid, tert-butyl hydroquinone, beta carotene, butylated hydroxy toluene, or a gallate. Preferably, 0.1 to 2 wt % of an antioxidant may be present in the composition.

Suitable preservatives are quaternary alkyl ammonium compounds or imidazolinium derivatives. Preferably, 0.1 to 2 wt % of a preservative may be present in the composition.

An example of a suitable anti-ingestion agent is Bitrex™, which is made by McFarlane Smith Ltd and comprises denatonium benzoate. Preferably, up to 2 wt % of an anti-ingestion agents may be present in the composition.

A gelled composition according to the invention preferably comprises in addition to the hydrocarbon and the triblock copolymer:
i) fragrance in an amount of up to 7 wt %, preferably up to 5 wt %,;
ii) coloring agent in an amount of up to 1 wt %; and
iii) anti-oxidant in an amount of up to 1 wt %.
All of the above percentages are in relation to the total weight of the candle body composition, i.e., excluding the wick and container.

A candle body may be prepared by mixing the hydrocarbon oil and the medium molecular weight triblock copolymers and low molecular weight triblock copolymers at an elevated temperature, e.g., 100–120° C., and then cooling to a temperature of 70 to 90° C., more preferably 80° C. to 85° C. On cooling further the composition may then be added while the oil/polymer mix is still in liquid form. Preferably, the components are mixed together and then poured into a container containing the wick to form the candle body.

Alternatively, polymerization of the gelled composition can be conducted in molds or carried out to form a continuous or semi-continuous body, which is then cut into the desired shapes. Preferably, the polymerization takes place when the wick is already present.

The invention will be illustrated by the following specific, non-limiting Examples.

Method of Manufacture of the Candles from Gel

The candle consists of a liquid mineral oil that is gelled using a polymeric thickening agent, e.g., a KRATON™ copolymer. The candle may also contain fragrance and, if desired, a dye.

Method of Manufacture of the Gel

The appropriate amount of oil is weighed into a beaker and heated up to 120° C., while stirring with a Heidolph mixer at 350–450 rpm.

When the oil reaches 120° C., copolymeric thickening agent(s), e.g., the KRATON® copolymer(s) is/are gradually added while stirring.

When all the KRATON® copolymer has dissolved, the temperature of the mix is reduced to about 85° C., and fragrance and 12-hydroxystearic acid (if present) are added slowly and left to stir for 10 minutes. Care is needed in adding the fragrance to the mix.

Method of Manufacture of the Candle

The heater is turned off, and a dab of gel mix is used to fix the wick to the base of the glass. The gel is then poured into candle glasses (100 g fill weight).

The mix compositions are as set out below. All amounts are in percentages by weight.

EXAMPLE 1

| Ingredient | Wt % |
| --- | --- |
| Hydrocarbon oil | 88 |
| KRATON ® G 1650 | 3.75 |
| KRATON ® G 1652 | 3.75 |
| Fragrance | 4.5 |

Results: pool temp: 75° C.; some creep

EXAMPLE 2

| Hydrocarbon oil | 88 |
| --- | --- |
| KRATON ® G 1650 | 5.625 |
| KRATON ® G 1652 (RTM) | 1.875 |
| Fragrance | 4.5 |

Results: pool temp: 80° C.; some creep

EXAMPLE 3

| Hydrocarbon oil | 88 |
| --- | --- |
| KRATON ® G 1650 | 1.875 |
| KRATON ® G 1652 | 5.625 |
| Fragrance | 4.5 |

Results: pool temp: 70–75° C.; High creep

EXAMPLE 4

| Hydrocarbon oil | 87.9 |
| --- | --- |
| KRATON ® G 1650 | 3.75 |
| KRATON ® G 1652 | 3.75 |
| Fragrance | 4.5 |
| 12-hydroxystearic acid | 0.1 |

Results: pool temp: 75° C.; creep OK

Comparative Example A

| Hydrocarbon oil | 85.5 |
| --- | --- |
| KRATON ® G 1650 | 10 |
| Fragrance | 4.5 |

Results: pool temp: too high

Comparative Example B

| Hydrocarbon oil | 93.0 |
| --- | --- |
| KRATON ® G 1650 | 2.5 |
| Fragrance | 4.5 |

Results: the candle flows out of container quickly

Comparative Example C

| Hydrocarbon oil | 88 |
| --- | --- |
| KRATON ® G 1654 | 7.5 |
| Fragrance | 4.5 |

Results: High mol weight co-polymer; Too high melt point to add fragrance

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

I claim:

1. A gelled hydrocarbon composition suitable for use as a candle body, comprising a hydrocarbon oil and from 0.01 to 3 wt % of a fatty acid, the composition being gelled with a low molecular weight triblock polymer having a Mw or Mn from 20,000 to 82,000 and a medium molecular weight triblock polymer having a Mw or Mn from 82,000 to 150,000.

2. The gelled hydrocarbon composition according to claim 1, in which the triblock copolymers include copolymers selected from the group consisting of up to 5% diblock copolymer, radial block copolymer, and multiblock copolymer.

3. The gelled hydrocarbon composition according to claim 1, in which the triblock polymers comprise linear block styrene-ethylene-butylene-styrenes, optionally hydrogenated to impart thermal stability during processing.

4. The gelled hydrocarbon composition according to claim 1, in which the hydrocarbon oil comprises a natural or synthetic hydrocarbon oil of $C_{16}$ to $C_{50}$.

5. The gelled hydrocarbon composition according to claim 1, in which the hydrocarbon oil comprises an oil selected from the group consisting of paraffinic oil, naphthenic oil and natural mineral oil.

6. The gelled hydrocarbon composition according to claim 1, wherein said fatty acid is a compound selected from the group consisting of formula (I) and formula (II):

$$HO-(CH_2)_u-COOH \qquad (I)$$

$$CH_3-(CH_2)_p-CH(OH)-(CH_2)_q-COOH \qquad (II)$$

in which u is 8 to 24; p is 0 to 16; and q is 8 to 24.

7. The gelled hydrocarbon composition according to claim 1, in which the hydrocarbon oil is present in an amount of 70 to 99 wt %, and the triblock polymers are present in an amount of 1–30 wt %.

8. The gelled composition according to claim 1, further comprising:
   i) fragrance in an amount up to 7 wt %;
   ii) coloring agent in an amount up to 1 wt %; and
   iii) anti-oxidant in an amount up to 1 wt %.

9. A candle comprising:
   i) a candle body and
   ii) a wick located in the body,
      the body comprising a gelled hydrocarbon composition according to claim 1.

10. The candle according to claim 9, in which the candle body comprises the hydrocarbon oil in an amount of 70 to 99 wt %, and the triblock polymers are present in an amount of 1–30 wt %.

11. The candle according to claim 9, further comprising at least one component selected from the group consisting of fragrances, malodor counteractants, insecticides, pesticides, insect repellants, colorants, anti-oxidants, preservatives, anti-ingestion agents, stabilizers, deodorizers, and masking agents.

12. The candle according to claim 11, wherein the component(s) are present in an amount of 1 to 20 wt %.

13. A process for preparing a gelled hydrocarbon composition according to claim 1, comprising:
   (a) mixing the hydrocarbon oil with the triblock copolymers in powdered form at elevated temperature,
   (b) reducing the temperature of the resulting mixture, and
   (c) adding, while mixing, the fatty acid and, optionally, any further additives to the mixture.

14. The process according to claim 13, wherein the mixing step (a) comprises homogenizing at 100–120° C., the temperature is reduced to 70–90° C. in step (b), the mixing of step (c) is carried out at 400–500 rpm, and the additive(s) include a fragrance.

* * * * *